US006602573B2

(12) United States Patent
Pezzato

(10) Patent No.: US 6,602,573 B2
(45) Date of Patent: Aug. 5, 2003

(54) RIBBON SEAL FOR DOCUMENTS

(75) Inventor: David A. Pezzato, Grand Rapids, MI (US)

(73) Assignee: Baudville, Inc., Grand Rapids, MI (US)

( * ) Notice: Subject to any disclaimer, the term of this patent is extended or adjusted under 35 U.S.C. 154(b) by 39 days.

(21) Appl. No.: 10/028,626

(22) Filed: Dec. 20, 2001

(65) Prior Publication Data

US 2003/0118773 A1 Jun. 26, 2003

(51) Int. Cl.[7] .................................................. B23B 3/00
(52) U.S. Cl. ............................ 428/80; 428/81; D19/12; 156/60
(58) Field of Search ...................... 428/80, 81; D19/12; 156/60

(56) References Cited

U.S. PATENT DOCUMENTS

| | | | | |
|---|---|---|---|---|
| 1,343,953 | A * | 6/1920 | Wolters | D19/12 |
| 2,471,590 | A | 5/1949 | Southgate | |
| 2,562,919 | A | 8/1951 | James | |
| 4,900,632 | A | 2/1990 | McGrath | |
| 5,116,687 | A | 5/1992 | Asano et al. | |
| 5,545,486 | A | 8/1996 | Asano et al. | |
| 6,030,669 | A | 2/2000 | Fascio | |

* cited by examiner

*Primary Examiner*—Alexander S. Thomas
(74) *Attorney, Agent, or Firm*—Price, Heneveld, Cooper, DeWitt & Litton

(57) ABSTRACT

A pre-cut award ribbon including an inverted, generally V shaped unitary piece of ribbon stock which, when placed underneath a seal, gives the appearance of being two separate pieces of ribbon located under the seal.

16 Claims, 1 Drawing Sheet

RIBBON SEAL FOR DOCUMENTS

BACKGROUND OF THE INVENTION

The present invention relates to ribbon seals used on documents, as for example, award certificates. For years, prior artisans have applied ribbon seals to documents by placing a foil, wax, plastic or like seal on the document, on top of two separate pieces of ribbon. This has been a standard, and probably the most commonly used approach for applying ornamental seals to documents.

One other type of ribbon seal is that in which a single ribbon is tied through holes in a multiple page document, with two ends of the ribbon trailing down the face of the document. The seal is then applied over the trailing ends as evidence that the document has not been tampered with.

SUMMARY OF THE INVENTION

The ribbon seal of the present invention includes an inverted, generally V shaped unitary piece of ribbon over which a seal is placed, giving the appearance of two separate pieces of ribbon located under the seal.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 2:
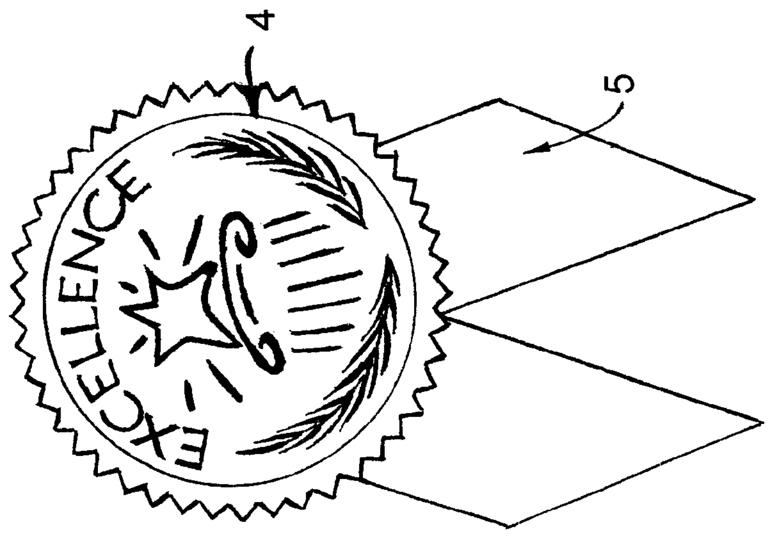
FIG. 2 is a plan view of an inverted generally V shaped unitary piece of ribbon placed under a seal.

In a preferred embodiment of the invention, an inverted, generally V shaped unitary piece of pre-cut ribbon (FIG. 1) is placed, in a planar relation, underneath seal 4 so that the pre-cut ribbon 5 and seal 4 assembly resemble two pieces of separate ribbons located underneath seal 4 (FIG. 2).

Pre-cut ribbon 5 can be made of a variety of materials, including fabrics such as silk, cotton, satin, lace, synthetic fabrics or blends of aforementioned or additional fabrics. Other materials may include materials such as foil, paper or felt. Preferably, it is cut from fabric ribbon stock.

Figure 1:
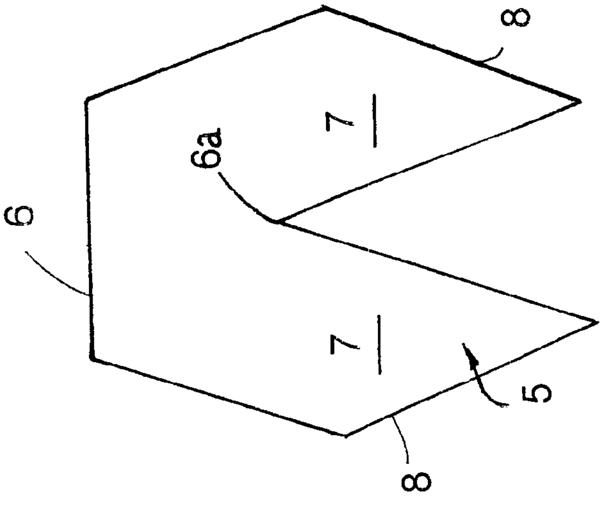
FIG. 1 is a plan view of an inverted generally V shaped unitary piece of ribbon.

Ribbon 5 is pre-cut into a generally V-shaped configuration, having a truncated apex or base 6 and legs 7 diverging away from one another and downwardly from truncated apex 6. It is to be applied to the document in an inverted position (FIG. 1). Preferably, what would be the apex of the "V" is truncated so as to leave ribbon 5 with a straight or possibly curved top border 6 as shown in FIG. 1 so that one can apply seal 4 without worrying about having the point of the "V" extend beyond the perimeter of seal 4.

The legs 7 of ribbon 5 diverge downwardly away from base 6 to leave a V-shaped opening therebetween. Legs 7 terminate at edges 8, which can be cut straight across the legs, or at an angle as shown in FIG. 1, to give a more artistic appearance. The area of ribbon 5 from base 6 to point 6*a*, where legs 7 separate, is referred to herein as the "base area" of ribbon 5.

Seal 4 can be made of any of a number of conventional seal materials. Foil seals are commonly used, and are preferable. However, the seal could be wax, plastic, paper or other material, so long as it affords the appearance of a conventional seal.

An embossed seal is preferred. The most preferred shape is circular, though other conventional geometric shapes such as octagons, triangles, hexagons, squares or the like could be used as a seal.

Except for projections created by embossing, seal 4 is generally flat. As is conventional for seals, it preferably has a relatively simple geometric configuration, though the edges may be scalloped to give a decorative configuration. In the most preferred embodiment, seal 4 is a generally flat piece of foil, which has been embossed, which is circular in configuration and which has a scalloped edge (FIG. 2).

Seal 4 is positioned generally over the base area of ribbon 5, preferably entirely over base area 6*a*. In this way, one does not see the point 6*a* where legs 7 separate, and the entire assembly gives the appearance of two separate pieces of ribbon being located under seal 4, with legs 7 extending out from seal 4. Preferably, seal 4 is adhered to ribbon 5 via a releasable adhesive. Prior to the assembly of seal 4 and ribbon 5, a releasable adhesive is applied to the back of seal 4. The base area of ribbon 5 is then releasably adhered to the back of seal 4 leaving a portion of the back of seal 4 exposed. Utilizing the remaining adhesively coated exposed back of seal 4, the entire assembly may then be releasably adhered to a document.

The above description is considered that of the preferred embodiment(s) only. Modifications will occur to those skilled in the art and to those that make or use the invention. Therefore, it is understood that the embodiment(s) shown in the drawings and described above are merely for illustrative purposes and not intended to limit the scope of the invention, which is defined by the following claims, as interpreted according to the Principles of Patent Law, including the Doctrine of Equivalents.

The invention claimed is:

1. A ribbon and seal combination comprising:

a unitary piece of ribbon which is generally "V" shaped in configuration, having a base area and legs extending away from said base area diverging away from one another as they do;

a seal being positioned generally over said base area of said unitary piece of ribbon such that said legs extend from under said seal and appear to be two separate ribbons.

2. The ribbon and seal combination of claim 1, wherein said unitary piece of ribbon comprises silk, cotton, satin, lace or synthetic fabrics.

3. The ribbon and seal combination of claim 1, wherein each of said legs of unitary piece of ribbon has an angled end.

4. The ribbon and seal combination of claim 1, wherein said generally "V" shaped unitary piece of ribbon has a truncated apex, which defines a base; said base area extending from said base generally to the point where said legs separate from one another.

5. The ribbon and seal combination of claim 1, wherein said seal comprises foil, wax, plastic, or paper.

6. The ribbon and seal combination of claim 1, wherein said seal comprises a foil seal.

7. The ribbon and seal combination of claim 6, wherein said seal comprises an embossed texture.

8. The ribbon and seal combination of claim 7, wherein said seal comprises a scalloped edge.

9. A method for making a ribbon and seal combination comprising:

providing a unitary piece of ribbon which is generally "V" shaped in configuration, having a base area and legs extending away from said base area and diverging away from one another as they do;

positioning a seal generally over said base area of said unitary piece of ribbon such that said legs extend from under said seal and appear to be two separate ribbons;

adhering said base area of said unitary piece of pre-cut ribbon to the back of said seal, leaving a portion of the back of said seal exposed, giving the appearance that the ribbon and seal assembly comprise two separate pieces of ribbon located under said seal with ribbon legs extending out from said seal; and adhering said ribbon and seal assembly to a document such that the adhesively coated exposed back of said ribbon and seal assembly is releasably adhered to a document.

10. The method of claim 9, wherein said unitary piece of ribbon comprises silk, cotton, satin, lace, or synthetic fabrics.

11. The method of claim 9, wherein each of said legs of said unitary piece of ribbon has an angled end.

12. The method of claim 9, wherein said generally "V" shaped unitary piece of ribbon has a truncated apex, which defines a base; said ribbon including a base area extending from said base generally to the point where said legs separate from one another.

13. The method of claim 9, wherein said seal comprises foil, wax, plastic, or paper.

14. The method of claim 9, wherein said seal comprises a foil seal.

15. The method of claim 14, wherein said seal comprises an embossed texture.

16. The method of claim 15, wherein said seal comprises a scalloped edge.

* * * * *